UNITED STATES PATENT OFFICE.

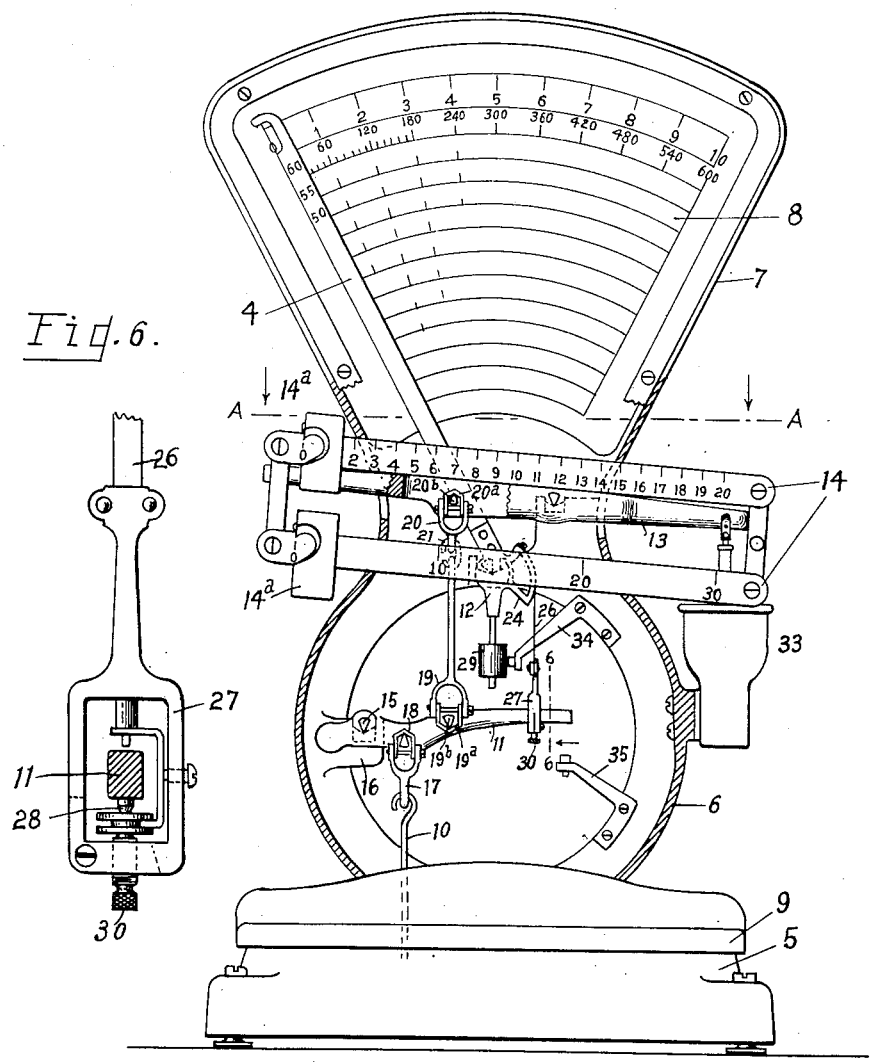

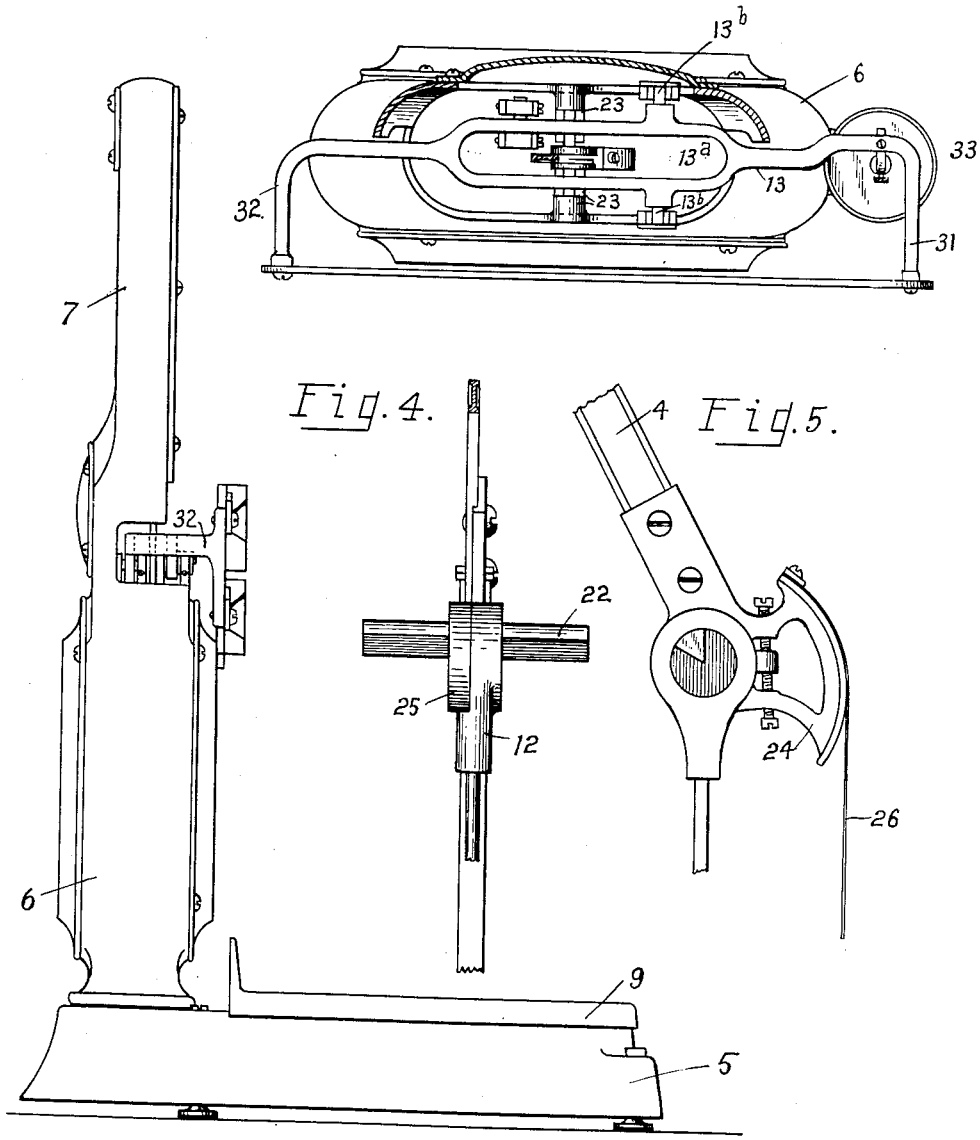

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING SCALE.

1,404,766.  Specification of Letters Patent.  Patented Jan. 31, 1922.

Application filed January 7, 1916. Serial No. 70,758.

*To all whom it may concern:*

Be it known that I, HALVOR O. HEM, a citizen of the United States, residing at Toledo, in the county of Lucas and State of Ohio, have invented certain new and useful Improvements in Weighing Scales, of which the following is a specification.

My invention relates to weighing scales of the automatic and semi-automatic types, and while the invention is herein described specifically as embodied in an automatic computing platform pendulum scale to which it is well adapted, it will be understood that it is not limited to scales of this type, but is applicable in its various features to other types of scales. In scales of the type herein illustrated it is desirable to provide one or more tare beams in addition to the pendulum counterbalance mechanism, and to actuate both the tare beam and pendulum counterbalance from a single set of platform levers. It has been found, however, that the angular movement of the tare beam should be of less extent than the angular movement of the pendulum weight, and one of the objects of the present invention is to provide a construction whereby the desired difference of angular movements of the pendulum and tare beam is allowed with but a single actuating connection secured to the platform lever mechanism.

Other objects and advantages will readily appear from the following description, in which reference is had to the accompanying drawings illustrating a preferred embodiment of my invention and wherein similar reference numerals designate similar parts throughout the several views.

In the drawings:—

Fig. 1 is a front elevation of the scale, with parts broken away to reveal certain interior construction to be hereinafter specifically referred to; Fig. 2 is a side elevation of the scale; Fig. 3 is a horizontal section upon the line A—A of Fig. 1; Fig. 4 is an enlarged detail view of a portion of the pendulum mechanism in end elevation; Fig. 5 is a side elevation of the details shown in Fig. 4, and Fig. 6 is a detail section taken on the line 6—6 of Fig. 1.

In the particular scale chosen to exemplify my invention, a hollow base 5 supports at one end a housing 6 upon which is mounted a fan-shaped casing 7 for the indicator chart 8. As shown, the housing and casing are substantially integral with each other and separable from the base, though this is not essential. The hollow base is adapted to contain a leverage system (not shown) upon which is supported a goods receiver or platform 9 as is common in scales of this character, and the leverage system is connected by a link 10 with a substantially horizontally-disposed beam or lever 11 mounted in the housing 6 intermediate the base and the chart casing, the beam 11 being suitably connected with a pendulum counterbalance 12, carrying an indicator hand 4, and the scale beam 13 adapted to carry one or more tare beams 14. It is to be understood that any suitable platform and platform lever mechanism may be employed in connection with the weighing mechanism of the scale, the weighing mechanism herein shown being designed to satisfactorily operate when employed in various forms of scales, as for example, in dormant, portable or hanging scales. The beam or lever 11 is provided with suitable knife edge pivots 15 resting upon bearings suitably mounted in the bracket 16 carried by the housing 6, and is further provided with suitable pivots for co-operation with the connecting members respectively connecting the beam 11 with the platform lever mechanism, the pendulum counterbalance and the scale beam carrying the tare beams. As herein shown, the link 10 is connected at its upper end with a stirrup 17 carrying suitable bearings 18 adapted to rest upon knife edge pivots carried by the beam 11 adjacent the fulcrum pivots 15 of the latter, the lower end of the link 10 being connected in any suitable manner with the platform lever mechanism. The connection between the beam 11 and the scale beam 13 comprises oppositely-disposed stirrups 19 and 20 respectively, suitably connected by a link or links 21 and carrying bearings 19ᵃ and 20ᵃ co-operating with oppositely directed knife edge bearings 19ᵇ and 20ᵇ carried by the beam 11 and the scale beam 13. The pendulum counterbalance 12 is suspended by knife edge pivots 22 from seats 23—23 (see Fig. 3) formed upon brackets upon the front and rear walls of the housing 6. The segment 24 is formed integral with or secured to the casting 25 in which the knife edge pivot 22 is mounted, and co-operates with a band or ribbon 26 which is secured at its upper end to the segment and at its lower end carries a stirrup or yoke 27 co-operating with the pivot 28 of the beam 11 (see Fig. 6). The pendulum 29 is suitably mounted for angular adjustment relative to the segment 24 in the usual manner of pendulum scales. The pivot 28 of the beam 11 is herein shown as a downwardly-extending cone pivot seated in a conical depression in the upper face of the screw 30 threaded in the lower arm of the yoke 27.

The scale beam 13 is preferably formed with a longitudinal opening or slot 13ª (see Fig. 3), the knives 13ᵇ being connected to the opposite legs of the beam, said knives resting upon bearings mounted in brackets carried by the front and rear walls of the casing 7. The indicator hand 4 extends through the longitudinal slot 13ª which is made of a sufficient length to permit the free movement of said hand, and at the opposite ends of the slot the branches of the beam 13 are united and formed into outwardly extending horns 31 and 32 which extend through side openings in the housing and are diverted slightly upwardly to support the upper tare beam herein shown, and then extended downwardly to form supports for the lower tare beam 14. The tare beams are suitably graduated and provided with slidable poises 14ª. To damp the movement of the weighing mechanism, a dash pot 33 is employed, being preferably connected as herein shown with the scale beam 13. From the above description it will be obvious that the weight of any commodity placed upon the platform 9 will be supported upon the platform lever mechanism (not shown) and through these levers will exert a pull tending to swing the beam 11 downwardly, which pull will be transmitted to the scale beam 13 and the pendulum counterbalance, swinging the same upwardly from the positions shown in Fig. 1 until the system is again in equilibrium, when the weight of the commodity may be read upon the scale. If the weight of the commodity is less than the capacity of the chart 8 its weight and value at any particular price per unit of weight may be read upon the indicator chart 8, but if the weight of the commodity exceeds the capacity of the chart, one or more of the poises 14ª is moved along its tare beam, as will be understood. Brackets 34 and 35 are mounted upon the housing 6 and carry rubber bumpers positioned and arranged to prevent undue movement of the pendulum 29 and beam 11 respectively.

It will be noted that in the embodiment herein illustrated the connection of the beam 11 with the scale beam 13 is much closer to the fulcrum of the beam 11 than is the connection of said beam with the pendulum counterbalance. This disposition of connecting members at widely separated points of the beam 11 results in imparting a greater movement to the ribbon connection with the pendulum so that the desired extent of angular movement of the pendulum is permitted without an undesirable degree of multiplication in the segment 24—i. e, the segment 24 may be made of larger radius and consequently more accurate in its operation than if a lesser degree of movement were imparted to the ribbon 26. On the other hand, the connection between the beam 11 and the scale beam 13 carrying the tare beams being much nearer the fulcrum of the beam 11, a comparatively small degree of movement will be imparted to said scale beam, so that the angular movement of the latter is maintained within desirable limits.

Having described my invention, I claim:

1. In a scale, and in combination with the platform-supporting lever mechanism thereof, a scale-beam, a pendulum, an intermediate beam or lever connected with the pendulum, and connections from said intermediate lever to the scale-beam and platform lever mechanism respectively, engaging said lever at separated points.

2. In a scale, and in combination with the platform-supporting lever mechanism thereof, a scale-beam, a pendulum, an intermediate beam or lever connected with the pendulum, and connections from said intermediate lever to the scale beam and platform lever mechanism respectively engaging said lever at separated points, the connection to the pendulum being secured to said intermediate lever at a point distant from the fulcrum of said lever.

3. In a scale and in combination with the platform lever mechanism thereof, a scale beam, a pendulum, an intermediate lever, separated connections from the intermediate lever to said platform lever mechanism and said scale beam respectively, and a connection from the intermediate lever to the pendulum and secured to the intermediate lever at a greater distance from the fulcrum thereof than the connection to the scale beam.

4. In a scale, and in combination with the platform lever mechanism thereof, a scale-beam, tare beams carried thereby, poises movable on said tare beams, an indicator chart, a pendulum, an indicator hand actuated by the pendulum and moving over the chart, a substantially horizontal intermediate lever connected with the pendulum, and separated connections extending from the intermediate lever to the scale-beam and platform lever mechanism respectively.

5. In a scale, and in combination with the platform lever mechanism thereof, a scale casing, an indicator chart mounted therein, a scale-beam mounted below said chart and carrying tare beams, a pendulum mounted adjacent said scale-beam and carrying an indicator hand adapted to move over the indicator chart, a normally-horizontal intermediate lever connected with the pendulum, and separated connections extending from the intermediate lever to the scale-beam and platform lever mechanism respectively.

6. In a scale and in combination with the platform lever mechanism thereof, a scale beam, an indicator chart, a pendulum mounted adjacent the scale beam and carrying an indicator hand adapted to move over the chart, an intermediate lever connected with the platform lever mechanism, a connection from the intermediate lever to the scale beam and connected with the intermediate lever more remote from its fulcrum than the connection with the platform lever mechanism, and connections between the intermediate lever and the pendulum at a point distant from the fulcrum of the intermediate lever.

7. In a scale and in combination with the platform lever mechanism thereof, a scale beam, a pendulum, an intermediate lever operatively connected with said pendulum, and separated means engaging the intermediate lever at different points for establishing operative connections between the intermediate lever and said platform lever mechanism and said scale beam respectively.

HALVOR O. HEM.

Witnesses:
RUSSELL J. BODMAN,
EDWARD F. ULRICH.